United States Patent [19]

Bolf

[11] Patent Number: 4,787,330

[45] Date of Patent: Nov. 29, 1988

[54] SELF-CLEANING POWDER COATING BOOTH

[76] Inventor: Carl R. Bolf, 1707 Mulberry Cir., Noblesville, Ind. 46060

[21] Appl. No.: 136,355

[22] Filed: Dec. 22, 1987

[51] Int. Cl.$^4$ ............................................. B05B 15/12
[52] U.S. Cl. .................................... 118/308; 118/326; 118/DIG. 7; 98/115.2
[58] Field of Search .......... 118/630, 308, 326, DIG. 7; 98/115.2

[56] References Cited

U.S. PATENT DOCUMENTS

| | | | |
|---|---|---|---|
| 3,741,155 | 6/1973 | Hunder | 118/326 X |
| 3,921,576 | 11/1975 | Vertue | 118/326 |
| 4,073,265 | 2/1978 | Walling et al. | 118/326 X |
| 4,231,289 | 11/1980 | Domicent | 118/326 X |

Primary Examiner—Shrive Beck
Attorney, Agent, or Firm—Woodard, Emhardt, Naughton Moriarty & McNett

[57] ABSTRACT

A spray booth for collecting excess electrostatically sprayed powder. A powder coating chamber is formed by a plurality of interconnected walls spaced apart and mounted to a plurality of outer interconnected walls. A pressurized gas chamber positioned between the inner and outer walls is connected to a source of pressurized gas. The inner walls include a plurality of louvers allowing the pressurized gas within the gas chamber to escape into the powder coating chamber and flow parallel adjacent the inner walls preventing contact between the inner walls and excess electrostatically sprayed powder. The vertically extending inner side walls include louvers which extend into the pressurized gas chamber and upwardly towards the top inner wall causing the pressurized gas escaping through the inner side walls to flow downwardly toward the bottom wall. A plurality of additional louvers formed on the bottom wall extend inwardly to the gas chamber and are oriented to allow pressurized gas to escape therefrom in directions parallel to the inner bottom wall and toward an exit opening connected to a excess spray powder collector and exhaust fan assembly.

17 Claims, 3 Drawing Sheets

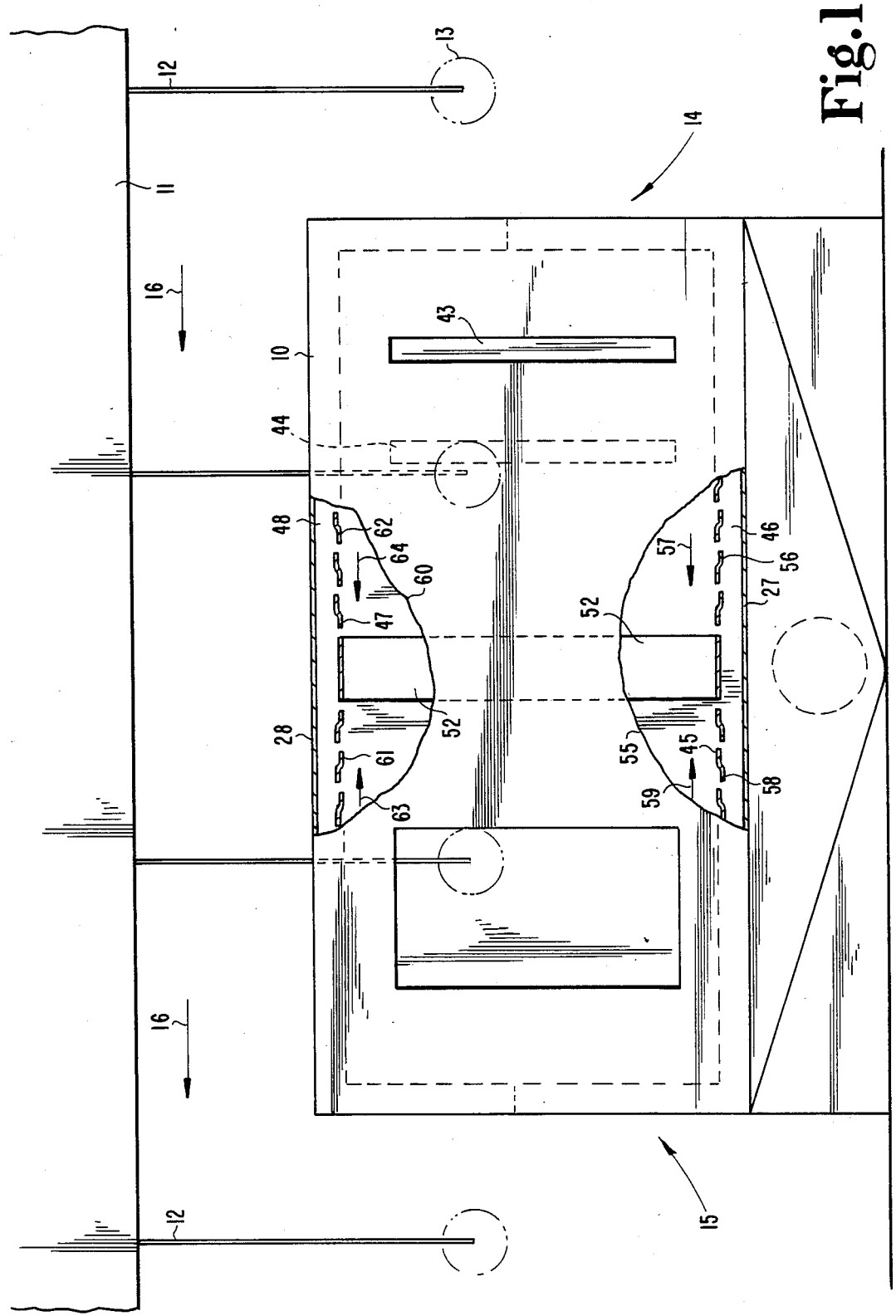

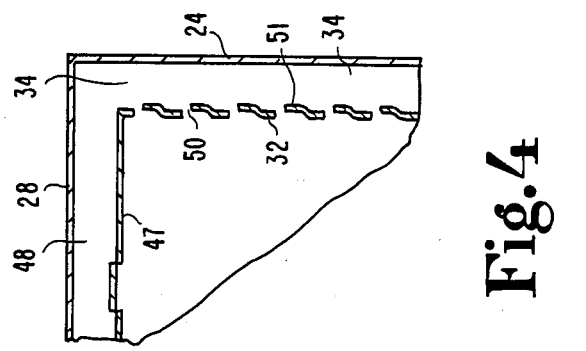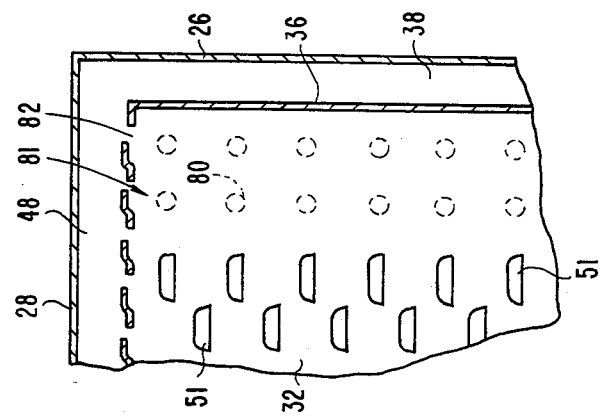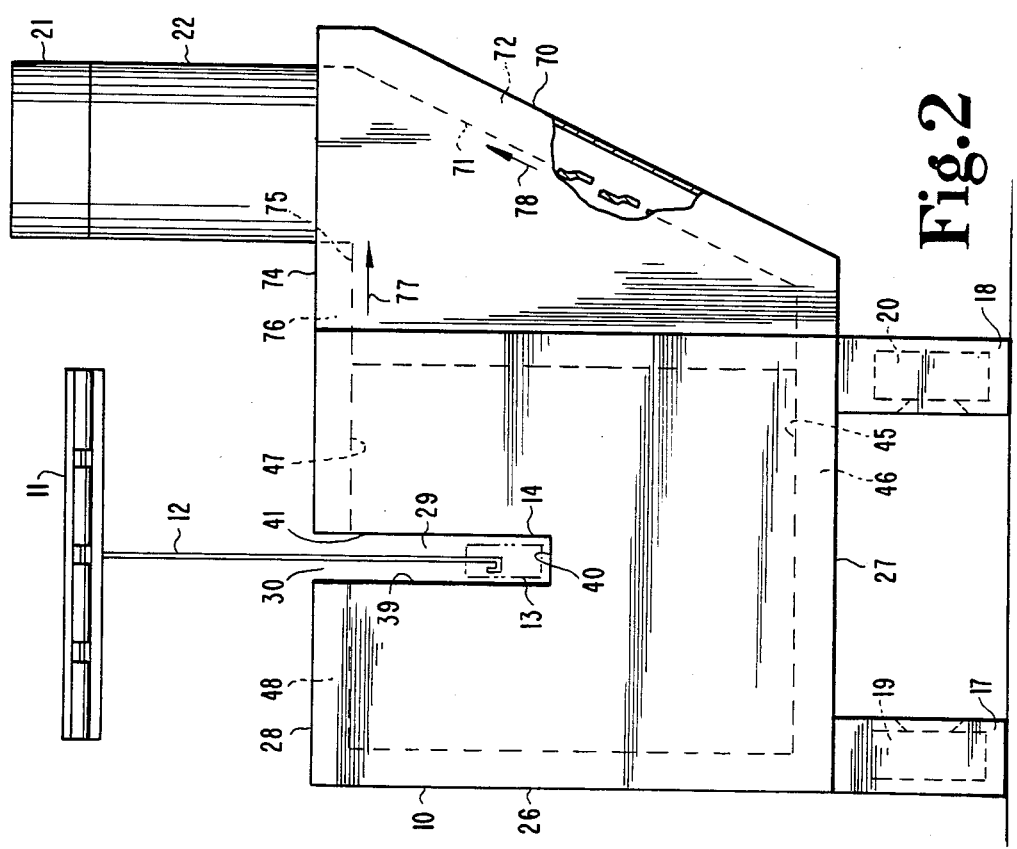

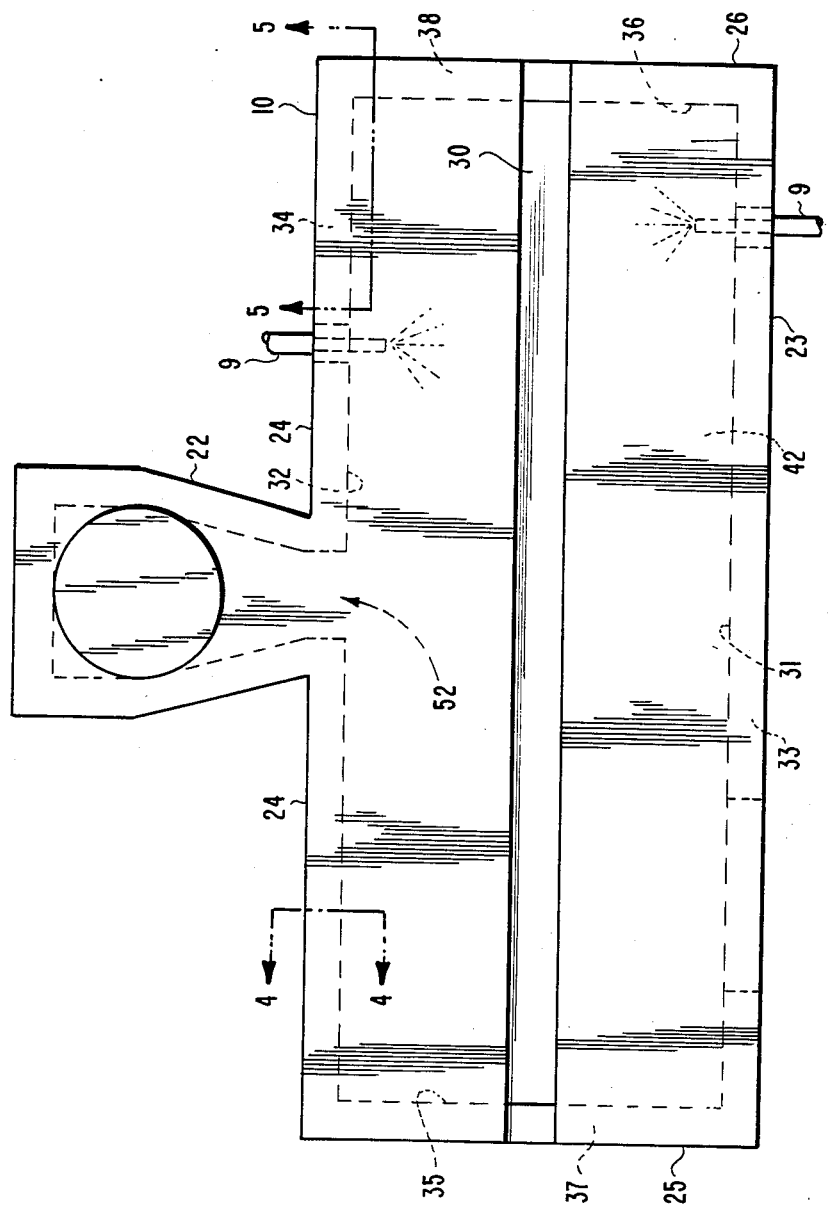

SELF-CLEANING POWDER COATING BOOTH

BACKGROUND OF THE INVENTION

This invention is in the field of spray booths utilized for electrostatic powder coating of products. It is the practice to convey the products to be coated through an electrostatic spray booth wherein the powder is sprayed onto the products which are then subsequently moved out of the spray booth and into a heating chamber.

The spray powder which does not cling to the product is subsequently collected and reused. Frequently, the color of the spray powder is changed depending upon the color requirements of the end product. It is therefore necessary to ensure that the salvaged spray powder of one color is not mixed with the salvaged spray powder of another color. One attempt to limit such mixing is by placing removable plastic sheets against the interior walls of the chamber within the spray booth. The plastic sheets are removed prior to the change in the color of the spray powder. Another approach such as disclosed in United Kingdom patent No. 1,588,503, issued to Toff, is to emit jets of pressurized air perpendicularly from the metal side walls of the spray booth chamber to prevent the electrostatically charged powder from clinging to the metal interior walls of the chamber. I have determined that superior results are provided when the air is not turbulent within the chamber, but instead emitted to flow parallel to the inner walls of the chamber thereby creating an air curtain or wall adjacent each of the interior walls of the chamber. In the booth disclosed herein, the spray powder which does not cling to the product rides on the air wall adjacent each interior wall to an exit conduit wherein the powder is withdrawn and collected.

In the Swiss patent No. 560,558, an electrostatic spray booth is disclosed wherein pressurized gas is utilized to collect the unused spray powder with an exit opening provided at the bottom of the chamber. In the booth disclosed herein, the pressurized gas emitted into the chamber is directed by a plurality of louvers oriented to direct all of the pressurized gas to the exit conduit. As such, the unused powder is prevented from collecting in any particular location within the chamber such as upon the bottom wall. Further, the louvers disclosed herein project exteriorally of the spray booth chamber minimizing turbulence within the chamber. Such orientation and positioning of such louvers have heretofore not been known.

SUMMARY OF THE INVENTION

One embodiment of the present invention is a self-cleaning powder coating booth comprising a plurality of interconnected outer walls forming a powder coating booth and including a top outer longitudinally slotted wall extending the length of the booth, a plurality of interconnected side inner walls, a top inner wall and bottom inner wall forming a powder coating chamber within the booth and being mounted interiorly to the outer walls but being spaced therefrom forming an gas chamber therebetween, the top inner wall being longitudinally slotted and aligned with the top outer longitudinally slotted wall extending the length of the booth, an exit conduit in communication with the powder coating chamber conveyor With a plurality of depending holders extendable through the top outer slotted wall and the top inner wall and being movable through the powder coating chamber along a center path of travel to hold items to be coated, a powder dispenser extendable into the powder coating chamber and operable to direct coating powder against the items to be coated, and, a source of pressurized gas connected to the gas chamber and operable to direct gas into the powder coating chamber. the side inner walls having a plurality of first louvers formed thereon oriented to direct pressurized gas from the ga chamber parallel to the side inner walls and downwardly to the bottom inner wall. the top inner wall and the bottom inner wall also including a plurality of additional louvers formed thereon oriented to direct pressurized gas flowing through the additional louvers from the gas chamber parallel to the top inner wall and the bottom inner wall and to the exit conduit.

It is an object of the present invention to provide an electrostatic spray booth which has new and improved means for collecting unused spray powder.

A further object of the present invention is to provide a self-cleaning powder coating booth.

Yet a further object of the present invention is to provide an electrostatic spray booth having automatic means for collecting all unused spray powder.

Related objects and advantages of the present invention will be apparent from the following description.

BRIEF DESCRIPTION OF THE DRAWINGS

FIG. 1 is a fragmentary side view of a spray booth incorporating the present invention.

FIG. 2 is an end view of the spray booth of FIG. 1.

FIG. 3 is a top view of the spray booth of FIG. 1.

FIG. 4 is an enlarged fragmentary cross-sectional view taken along line 4—4 of FIG. 3 and viewed in the direction of the arrows with conveyor 11 removed for purposes of clarity.

FIG. 5 is an enlarged fragmentary cross-sectional view taken along line 5—5 of FIG. 3 and viewed in the direction of the arrows.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the preferred embodiment of a spray booth 10 mounted beneath a conventional conveyor 11. A plurality of hangers or hooks 12 are movable by the conveyor through the electrostatic spray booth 10 with each hanger 12 having suspendedly mounted thereon the item 13 to be electrostatically coated. Booth 10 includes an entrance 14 and exit 15 which allows the conveyor to move objects 13 in the direction of arrow 16.

Spray booth 10 is mounted atop a frame or a pair of legs 17 and 18 (FIG. 2) having mounted positioned therein conventional centrifugal air fans 19 and 20 operable to pressurize the air chamber existing between the outer and inner walls of the spray booth. A conventional spray powder collector and exhaust fan assembly 21 is mounted to and is in communication with the exit conduit 22 opening into the spray booth to withdraw the excess spray powder from the booth. Spray booth 10 includes a pair of parallel and vertically extending exterior side walls 23 and 24 (FIG. 3) fixedly joined to a pair of parallel and vertically extending end walls 25 and 26. The external side walls and end walls are fixedly connected to a horizontally extending exterior bottom wall 27 (FIG. 2) and a slotted horizontally extended exterior top wall 28. As will be described later in this specification, the booth is operable without end walls 25 and 26. End walls 25 and 26 are each provided with a vertically opening slot forming the entrance 14 and exit 15 through which hanger 12 and the item 13 to be electrostatically coated move as conveyor 11 moves in the direction of arrow 16. Each vertically opening slot extends through and is aligned with a horizontally extending slot formed in the top wall 28. For example, end wall 26 includes a vertically opening slot 29 forming entranc 14 with slot 29 being aligned with slot 30 extending the length of top wall 28.

A plurality of inner walls are fixedly mounted to the outer walls by struts or other means forming the inner powder coating chamber. For example, vertically extending inner side walls 31 and 32 (FIG. 3) are fixedly secured to, but are spaced apart from, respectively, the outer side walls 23 and 24 forming, respectively, air or gas chambers 33 and 34. Likewise, a pair of vertically extending inner end walls 35 and 36 are fixedly secured to, but are spaced apart from, respectively, outer end walls 25 and 26 thereby forming gas chambers 37 and 38, respectively, both of which are in communication with gas chambers 33 and 34. A pair of vertical connecting walls and a horizontal connecting wall join together the inner and outer end walls around the entrance 14 and exit 15 of the powder coating chamber. For example, vertical walls 39 and 41 and horizontal wall 40 join together the inner end wall 36 to the outer end wall 26 preventing the escape of the pressurized gas within chamber 38 except through the louvers and apertures to be hereinafter described.

The inner connected outer walls form the powder coating booth 10 whereas the plurality of interconnected side and end inner walls, top inner wall and bottom inner wall form a powder coating chamber 42 (FIG. 3) within booth 10. Exit conduit 22 opens into powder coating chamber 42 and is spaced equidistant between end walls 35 and 36. Likewise, a pair of vertically extending gun slots 43 and 44 extend respectively through side walls 23, 31 and 24, 32 and are positioned between end wall 36 and exit conduit 22. The slots allow conventional and commercially available powder guns 9 to extend into the powder coating chamber 42 being operable to spra into the chamber electrostatically charged coating powder which subsequently clings to items 13 as they are moved by conveyor 11 along a path of travel centrally located between the side walls of the powder coating booth. Thus, a conventional spray gun may be extended through slot 43 and a separate spray gun may be extended through slot 44 ensuring application of the electrostatically charged powder to the opposite sides of item 13. Pressurized gas is prevented from escaping from chambers 33 and 34 within slots 43 and 44 by means of sealing walls which extend around each slot andconnect together the inner and outer side walls.

The pressurized gas within chambers 33 and 34 is emitted through a plurality of louvers formed on inner side walls 31 and 32 and oriented to direct the flow of gas downwardly toward the inner bottom wall 45 connected to, but spaced apart from, the bottom outer wall 27. Inner bottom wall 45 is also connected to inner side walls 31 and 32 and has a bottom gas chamber 46 in communication with chambers 33 and 34 as well as the end chambers 37 and 38.

The louvers on inner side wall 32 will now be described, it being understood that a similar description applies to the louvers on inner side wall 31. Inner side wall 32 includes a plurality of apertures 50 (FIG. 4) which are formed by inner wall 32 being formed to project into air chamber 34 thereby forming louvers 51. Each louver 51 includes a portion of wall 32 which is bent into gas chamber 34 so that the louvers project completely outward of side wall 32 and are positioned entirely within gas chamber 34. Louvers 51 are therefore located externally of the powder coating chamber 42 minimizing any turbulence adjacent the surface of wall 32 facing the powder coating chamber 42. Pressurized gas exits chamber 34 through apertures 50 with the upwardly directed louvers 51 causing the escaping pressurized gas to flow downwardly parallel to wall 32 toward the bottom interior wall 45. Thus, a pair of downwardly flowing air walls or air curtains are formed interiorally adjacent inner walls 31 and 32 preventing contact between the excess electrostatically charged powder and the inner side walls 31 and 32. Similarly. a plurality of louvers with corresponding apertures and louvers are provided on the inner end walls 35 and 36 allowing the pressurized gas within chambers 37 and 38 to escape through walls 35 and 36 into the powder coating chamber 42. The louvers formed on inner walls 35 and 36 are identical to louvers 51 in that the louvers project inwardly and upwardly within chambers 37 and 38 causing the pressurized ga within chambers 37 and 38 to flow downwardly parallel to and adjacent end walls 35 and 36 preventing contact between the excess electrostatically charged powder and the inner end walls. The excess spray powder is conveyed downwardly by the air curtains formed adjacent end walls 35 and 36 to the bottom end wall 45.

Additional louvers are formed on inner bottom wall 45 and allow the pressurized gas within chamber 46 to escape through the inner bottom wall and prevent excess electrostatically spray powder from contacting the bottom inner wall 45. The additional louvers are oriented to direct the excess spray powder toward the center location of the spray booth between inner walls 35 and 36 whereat the powder is located across from and exits conduit 22. Thus, the additional louvers are oriented to direct the escaping gas from chamber 46 in a first direction from end wall 36 to the opening 52 (FIG. 3) of exit conduit 22 whereas additional louvers formed on bottom wall 45 are oriented to direct the gas flow in an opposite direction from end wall 35 to opening 52.

Side walls 31 and 23 are fragmented at location 55 to illustrate the orientation of the additional louvers on inner bottom wall 45 to allow the pressurized gas within chamber 46 located above bottom side wall 27 to escape into the powder coating chamber 42. The additional louvers 56 provided on bottom wall 45 between exit opening 52 and inner side wall 36 are directed downwardly and toward end wall 36 to allow the escaping gas to flow in the direction of arrow 57 thereby conveying the excess electrostatically charged spray powder from the bottom of side walls 31 and 32 and end wall 36 toward exit opening 52. Likewise, the additional louvers 58 formed on bottom wall 45 and located between exit opening 52 and end wall 35 are oriented downwardly into gas chamber 46 and toward end wall 35 causing the excess electrostatically charged powder from the bottom of end wall 35 and side walls 31 and 32 to flow in the direction of arrow 59 to the exit conduit 52.

Top wall 47 is connected to, but spaced apart from, the top outer wall 28 forming pressurized gas chamber 48 therebetween which is in communication with chambers 33, 34, 38, 37 and 46. A further set of louvers 61 and 62 are depicted in FIG. 1 whereat side walls 23 and 31 have been fragmented at location 60 to illustrate the flow of escaping gas from chamber 48 in a manner similar to that escaping from chamber 46. Additional louvers 61 located between exit opening 52 and end wall 35 extend into chamber 48 and towards inner end wall 35 to cause the escaping gas to flow in the direction of arrow 63 from the end wall 35 to exit opening 52. Likewise, the further set of louvers 62 located between exit opening 52 and end wall 36 extend into chamber 48 and towards end wall 36 causing the gas escaping from chamber 48 to flow in the direction of arrow 64 from end wall 36 to the exit opening 52. Louvers 61, 62, 45 and 56 identical to the louvers shown in FIG. 4 except for the orientation. In all cases, the louvers are located within the pressurized gas chambers which are all in communication with each other and being pressurized by supply fans 19 and 20 which open into the pressurized gas chambers The commercially available cartridge collector and exhaust fan assembly 21 is operable to apply a negative pressure at exit opening 52 and withdraw all of the excess spray powder directed thereto by louvers 45, 56, 61 and 62.

Exit conduit 22 includes a plurality of outer walls connected together and spaced apart from a plurality of inner walls forming a pressurized gas chamber therebetween in communication with bottom chamber 46 and top chamber 48. That is, outer inclined wall 70 is joined to inner inclined wall 71 thereby forming a pressurized air chamber 72 in communication with bottom chamber 46. Likewise, a horizontally extending and aligned top wall 74 is connected to top wall 28 and is spaced apart from a horizontally extending inner wall 75 which is aligned with top inner wall 47 forming a pressurized gas chamber 76 in communication with chamber 48. Inner walls 75 and 71 include a plurality of louvers which extend respectively into chambers 76 and 72 and toward the powder coating chamber 42 to cause escaping pressurized gas from chambers 76 and 72 to flow respectively in the direction of arrows 77 and 78 thereby facilitating the flow of excess electrostatically charged spray powder from exit opening 52 to the assembly 21.

Many variations are contemplated and included in the present invention. For example, the drawing depicts a spray coating booth having opposite outer end walls 25 and 26 and opposite inner end walls 35 and 36. In an alternate embodiment, the end walls are deleted thereby providing a large entrance 14 and exit 15 which extends completely across the spacing between the inner side walls 31 and 32. In such a case, a pair of air curtains or walls are formed adjacent entrance 14 and exit 15. The air walls are created by apertures formed in the inner side walls 32 and 33 allowing the pressurized gas within chambers 33 and 34 to flow perpendicularly outward from the inner side walls 31 and 32. Thus, louvers are not utilized in the apertures immediately adjacent entrance 14 and exit 15. Such apertures adjacent entrance 14 and on side wall 32 will now be described, it being understood that a similar description applies to the air curtain apertures located on wall 33 adjacent entrance 14 and exit 15 and on side wall 32 adjacent exit 15. Apertures 80 are formed in two vertically extending rows 81 and 82 between the louvered apertures 51 and entrance 14. Thus, the gas escaping from gas chamber 34 flows perpendicularly outward from inner side wall 32 in the first two rows of apertures adjacent entrance 14 with the remaining apertures 51 being constructed with louvers to cause the escaping air to flow downwardly and parallel to inner side wall 32. FIG. 5 shows the preferred embodiment but also depicts the air curtain apertures 80, shown in dashed line for the alternative embodiment which does not have inner or outer end walls. Aperatures 80 are shown in the drawing to illustrate the positioning of the aperatures for the alternative embodiment. The alternative embodiment is identical to the preferred embodiment shown in the drawing except for the addition of aperatures and the absence of the inner and outer end walls.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:
1. A self-cleaning powder coating booth comprising:
a plurality of interconnected outer walls forming a powder coating booth and including a top outer longitudinally slotted wall extending the length of said booth;
a plurality of interconnected side inner walls, a top inner wall and bottom inner wall forming a powder coating chamber within said booth and being mounted interiorly to said outer walls but being spaced therefrom forming an gas chamber therebetween. said top inner wall being longitudinally slotted and aligned with said top outer longitudinally slotted wall extending the length of said booth;
an exit conduit in communication with said powder coating chamber;
conveying means with a plurality of depending holders extendable through said top outer slotted wall and said top inner wall and being movable through said powder coating chamber along a center path of travel to hold items to be coated;
powder dispensing means extendable into said powder coating chamber and operable to direct coating powder against said items to be coated; and,
gas pressurized means connected to said gas chamber and operable to direct pressurized gas into said powder coating chamber. said side inner walls having a plurality of first louvers formed thereon oriented to direct pressurized gas from said gas chamber parallel to said side inner walls and downwardly to said bottom inner wall, said top inner wall and said bottom inner wall also including a plurality of additional louvers formed thereon oriented to direct pressurized gas flowing through said additional louvers from said gas chamber parallel to said top inner wall and said bottom inner wall and to said exit conduit.

2. The booth of claim 1 and further comprising:
exhaust means connected to said exit conduit operable to pull pressurized ga within said powder coating chamber through said exit conduit; and,
said first louvers are completely located within said gas chamber.

3. The booth of claim 2 wherein:
said exit conduit is located between opposite ends of said side inner walls with som of said additional louvers located on said bottom inner wall oriented to direct gas flow in a first direction of said path of travel to said exit conduit and with some of said additional louvers on said bottom inner wall oriented to direct gas flow in a direction opposite of said first direction to direct gas flow to said exit conduit.

4. The booth of claim 3 wherein:
some of said additional louvers located on said top inner wall are oriented to direct gas flow in said first direction of said path of travel to said exit conduit and with some of said additional louvers on said top inner wall oriented to direct gas flow in a direction opposite of said first direction to direct gas flow to said exit conduit.

5. The booth of claim 4 wherein:
said exit conduit is located equidistant between opposite ends of said side inner walls.

6. The booth of claim 4 wherein:
said side inner walls extend vertically and said top inner wall and said bottom inner wall extend horizontally, one of said side inner walls includes a vertically extending passage opening into said exit conduit which includes an inclined wall extending upwardly from said bottom inner wall and a horizontally extending wall aligned with said top inner wall and converging to said inclined wall, said horizontally extending wall and said inclined wall include further louvers oriented to allow gas from said gas chamber to flow outwardly away from said powder coating chamber and carry powder from said powder coating chamber.

7. The booth of said claim 1 wherein:
said side inner walls include opposite ends forming an entrance and exit for said items to move into and out of said powder coating chamber and further include a plurality of apertures adjacent said opposite ends allowing pressurized gas from said gas chamber to flow perpendicularly outward from said side inner walls forming gas walls at sa id opposite ends limiting flow of powder from said powder coating chamber through said entranc and exit.

8. A self-cleaning powder coating booth comprising:
a housing including a plurality of interconnected side walls, a top wall and bottom wall forming a powder coating chamber, said top wall being longitudinally slotted extending the length of said powder coating chamber;
an exit conduit in communication with said powder coating chamber
conveying means with a plurality of depending holders extendable through said top wall and being movable through said powder coating chamber along a path of travel to hold items to be coated;
powder dispensing means extendable into said powder coating chamber and operable to direct coating powder against said items to be coated; and,
gas pressurized means connected to said housing and operable to direct pressurized gas into said powder coating chamber, said side walls having a plurality of first louvers formed thereon oriented- to direct pressurized gas parallel to sa:d side walls downwardly to said bottom wall, said top wall and said bottom wall also including a plurality of additional louvers formed thereon oriented to direct pressurized gas flowing through said additional louvers parallel to said to wall and said bottom wall to said exit conduit.

9. The booth of claim 8 and further comprising:
exhaust means connected to said exit conduit operable to pull pressurized gas within said powder coating chamber through said exit conduit; and wherein,
said first louvers project completely outward of said side walls and externally of said powder coating chamber.

10. The booth of claim 9 wherein:
said exit conduit is located between opposite ends of said side walls with some of said additional louvers located on said bottom wall oriented to direct gas flow in a first direction of said path of travel to said exit conduit and with some of said additional louvers on said bottom wall oriented to direct gas flow in a direction opposite of said first direction to direct gas flow to said exit conduit.

11. The booth of claim 10 wherein:
some of said additional louvers located on said top wall oriented to direct gas flow in said first direction of said path of travel to said exit conduit and with some of said additional louvers on said top wall oriented to direct gas flow in a direction opposite of said first direction to direct gas flow to said exit conduit.

12. The booth of claim 11 wherein:
said exit conduit is located equidistant between opposite ends of said side walls.

13. The booth of claim 8 wherein:
said side walls include opposite ends forming an entrance and exit for said items to move into and out of said powder coating chamber and further include a plurality of apertures adjacent said opposite ends allowing pressurized gas to flow perpendicularly outward from said side walls forming gas walls at said opposite ends limiting flow of powder from said powder coating chamber through said entrance and exit.

14. A self-cleaning powder coating booth comprising:
a housing including a plurality of interconnected side walls, a top wall and bottom wall forming a powder coating chamber, said top wall being longitudinally slotted extending the length of said powder coating chamber;
an exit conduit in communication with said powder coating chamber;
conveying means with a plurality of depending holders extendable through said top wall and being movable through said powder coating chamber along a path of travel to hold items to be coated;
powder dispensing means extendable into said powder coating chamber and operable to direct coating powder against said items to be coated; and,
gas pressurized means connected to said housing and operable to direct pressurized gas into said powder coating chamber, said side walls having a plurality of first louvers formed thereon oriented to direct pressurized gas parallel to said side walls and downwardly to said bottom wall, said first louvers project completely outward of said side walls and externally of said powder coating chamber, said side walls include opposite ends forming an entrance and exit for said items to move into and out of said powder coating chamber and further include a plurality of apertures adjacent said opposite ends allowing pressurized gas to flow perpendicularly outward from said side walls forming gas walls at said opposite ends limiting flow of powder from said powder coating chamber through said entrance and exit. said top wall and said bottom wall also including a plurality of additional louvers formed thereon oriented to direct pressurized gas flowing through said additional louvers parallel to said top wall and said bottom wall to said exit conduit.

15. The booth of claim 14 and further comprising:

exhaust means connected to said exit conduit operable to pull pressurized gas within said powder coating chamber through said exit conduit.

16. The booth of claim 15 wherein:

said exit conduit is located between opposite ends of said side walls with some of said additional louvers located on said bottom wall oriented to direct gas flow in a first direction of said path of travel to said exit conduit and with some of said additional louvers on said bottom wall oriented to direct gas flow in a direction opposite of said first direction to direct gas flow to said exit conduit.

17. The booth of claim 16 wherein:

some of said additional louvers located on said top wall oriented to direct gas flow in said first direction of said path of travel to said exit conduit and with some of said additional louvers on said top wall oriented to direct gas flow in a direction opposite of said first direction to direct gas flow to said exit conduit.

* * * * *